3,168,421
BIBULOUS ION PERMEABLE MEMBRANES
Garth H. Beaver and George K. Greminger, Jr., both of Midland, Mich., assignors to The Dow Chemical Company, Midland, Mich., a corporation of Delaware
No Drawing. Filed Aug. 25, 1961, Ser. No. 133,789
6 Claims. (Cl. 136—146)

The present invention concerns ion-permeable membranes that are advantageously adaptable for a variety of uses wherein the passage of ions through a water-insoluble but bibulous barrier is of interest. Particularly, the invention concerns improved ion-permeable, bibulous membranes obtained as reaction products of water-soluble cellulose ethers and a minor proportion of a water-soluble diepoxide. Such bibulous membranes provide highly efficient separators or diaphragms for galvanic dry cells.

In the prior art, U.S. Patent 2,534,336 shows dry cells prepared with diaphragms of films of water-soluble alkyl cellulose ethers insolubilized with a polybasic acid. Among the aspects of the dry cell art in which improvement is desirable is included providing novel and improved inert diaphragm membranes readily permeable to the diffusion of ions. A dry cell with such a diaphragm has a minimum of internal resistance and thus an improved life and higher effective voltage in an external circuit.

A principal object of the invention is to provide a water-insoluble, bibulous membrane advantageously adaptable for employment in uses requiring an improved ion-permeable barrier. Particularly, it is an object to provide strong, highly bibulous membranes for uses involving dialysis, electrodialysis, electrolytic cells and the like. A further object of the invention is to provide an improved dry cell. Additional objects and benefits of the invention will become manifest hereinafter as the invention is more fully described.

In accordance with the invention, improved water-insoluble, bibulous membranes are prepared from a liquid sol of a water-soluble cellulose ether composition, which sol has dissolved therein from about 0.1 up to about 25 percent by weight based on the weight of the cellulose ether of a water-soluble diepoxide and a small but effective amount of a catalyst for promoting the reaction of epoxide groups with labile hydrogens on the cellulose ether molecules. A layer of the liquid sol is formed by any convenient means as by casting or extruding a film. The layer is then subjected to curing temperatures within the range from about 80° C. up to temperatures just below the decomposition temperature of the composition when dried, e.g., about 275° C., for a sufficient period of time to achieve a dry and water-insolubilized product. Preferably, the curing is conducted at a temperature within the range from about 120° to 150° C. The cured product is a strong, water-insoluble but yet highly bibulous membrane which exhibits exceptional permeability to the passage of ions. If desired, as a modification of the above procedure, the sol layer can be dried at moderate temperatures prior to the curing operation.

As employed herein, the terminology "water-soluble" as applied to the cellulose ethers and diepoxides means dispersible in water without the aid of emulsifying agents to provide a visually homogeneous solution or dispersion. The liquid sol is usually formed with water but any other relatively highly polar solvent such as methanol, ethanol, dimethyl formamide, tetrahydrofurfuryl alcohol and the like solvents can be employed singly or in combination with water. Any such solvent utilized, of course, must be inert to the reactants and the catalyst for the reaction.

Water-soluble cellulose ethers that can be utilized in the present invention include any of the well known alkyl, alkoxy, carboxyalkyl, hydroxyalkyl and the like cellulose ethers and mixed ethers that are soluble in water to the extent of at least about 1 part of the ether per 100 parts of water. Specific examples include the methyl, ethyl, carboxymethyl, hydroxyethyl, hydroxypropyl-methyl and hydroxyethyl-methyl cellulose ethers having an average degree of substitution per each glucose residue moiety within a range which renders the resulting ether soluble in water. Usually the amount of cellulose ether employed will vary from about 1 up to about 50 percent by weight of the liquid sol. The upper limit is dictated by practical considerations as to ease of forming homogeneous layers.

The layers of the liquid sol are formed by any convenient means. The actual forming operation that may be employed most effectively with any particular sol is, to some extent, dependent upon the amount of cellulose ether solids present in the sol. With lesser amounts, say from about 1 up to 20 percent by weight of the cellulose ether based on the weight of the sol, the forming of the layers to be dried and subsequently cured is effectively accomplished by casting a film of the sol on an inert supporting surface of any desired shape. Sols containing larger amounts of the cellulose ether solids are usually sufficiently viscous or thick that they can be extruded to provide a layer in any continuous shape.

The diepoxides operable in the invention are those organic compounds having two glycidyl groups, which compounds are soluble in water to the extent of at least about 0.5 part of the diepoxide per 100 parts of water. Generally, the diepoxides correspond to the formula:

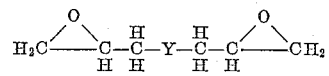

wherein Y is selected from the group of divalent radicals consisting of —O— and bivalent residues of water-soluble organic compounds having at least two hydroxyls wherein one labile hydrogen atom has been removed from each of two hydroxyls. For example, Y can be derived from oxygen in which instance the diepoxide is diglycidyl ether. Y may also be derived from alkylene glycols including ethylene glycol, propylene glycol and butylene glycol and polyalkylene glycols such as polyethylene glycol, polypropylene glycol and cogeneric mixtures of the foregoing, such polyhydric alcohols having a molecular weight or average molecular weight up to about 1200. Etherification of a cogeneric mixture of the polyalkylene glycols with an average of two glycidyl groups per molecule of the mixture provides a mixture of diepoxides anyone of which is individually characterized by the above formula. Other water-soluble compounds having at least two hydroxyl groups which can be etherified with glycidyl groups to provide a diepoxide include glycerol, 1,4-dihydroxybutane, 1,3-dihydroxybutane, resorcinol, 2,3-dihydroxytoluene, 2-methyl resorcinol, 4-methyl resorcinol, 2,4-dimethyl resorcinol and the like water-soluble polyhydroxy organic compounds.

Catalysts for the reaction include any of the water-dispersible activating agents for epoxide reactions with compounds having labile hydrogen atoms. Generally effective as catalysts are acids including Lewis acids and organic and inorganic bases. Specific catalysts include, for example, protonic acids such as hydrogen chloride, hydrogen bromide, nitric acid, sulfuric acid, sulfurous acid and phosphoric acid. Also effective are non-protonic Lewis acids such as boron trifluoride, sulfur trioxide, sulfur dioxide, stannic chloride and zinc chloride. Other catalysts are the inorganic bases such as, for example, sodium hydroxide, potassium hydroxide, calcium hydroxide, and ammonium hydroxide. Still other basic catalysts are organic compounds such as tertiary amines among which suitable ones are trimethylamine, triethylamine, tripropylamine and, in general, any water-soluble trialkylamine wherein the alkyl groups may be the same or different. Also having catalytic activity in the invention are the trialkanolamines such as triethanolamine and the heterocyclic bases such as pyridine, n-alkylpiperidine, quinoline, n-alkylpyrroles and pyrrolidines.

An effective amount of catalyst is usually relatively small. Effective amounts may vary from as little as about 0.001 up to as much as or more than 1 percent by weight based on the weight of the water-soluble cellulose ether used.

In most applications for the bibulous membranes of the invention, dry membrane thicknesses are not critical within broad limits. The desirable thickness will be largely determined by the strength needed for the application in which the membrane is to be utilized. In battery diaphragms, thicker membranes, however, increase the internal resistance of the completed battery cell and, therefore, are less desirable. The preferred battery diaphragm membrane thickness in the dry state ranges from about 1 up to 4 mils. Any desired thicknesses in the dry membrane can be achieved by adjusting either or both the solids content of the liquid sol and/or the thickness of the sol layer formed prior to the drying and curing operations.

Alternate techniques for the preparation of bibulous diaphragms of the invention include coating the catalyzed liquid sol directly on the inside surface of a battery can as by spinning or spray coating techniques and thereafter heating the coating until it is insolubilized to provide a diaphragm in situ.

Still another method involves coating or calendering the catalyzed liquid sol onto an inert bibulous substrate, e.g., paper, or other battery membrane material. The composite is then dried and cured to insolubilize the coating.

In a specific embodiment of the invention, a 7 percent water solution of a methyl cellulose ether, the ether being characterized by a viscosity of 25 centipoises in 2 percent aqueous solution thereof measured at 20° C. was prepared by first wetting the methyl cellulose ether with water at about 90° C. and thereafter adding sufficient cold water to provide the desired solution. To this solution was added about 1.5 percent by weight based on the weight of the methyl cellulose ether present of the diglycidyl ether of diethylene glycol. Two drops of triethylamine were added for each 100 cc. of the above-prepared sol. The sol was subjected to centrifugation to remove air bubbles and then cast into a layer 35 mils thick on a flat stainless steel plate. The layer was dried at a temperature of 25° C. Thereafter, the dried layer was removed from the plate and heated at a temperature of about 150° C. for 20 minutes whereby it was water-insolubilized to provide a bibulous membrane about 3 mils thick.

Another bibulous membrane was prepared in a manner identical to that of the foregoing except that 4.4 percent by weight of the diepoxide based on the weight of the methyl cellulose ether was employed and the resulting dry membrane was 1.0 mil thick.

The above-prepared bibulous membranes were cut into suitable shapes and incorporated into newly fabricated galvanic cells as separating diaphragms between the electrolytic paste and soluble metallic anode. Standard zinc battery cans and carbon rods were employed for the anode and cathode, respectively. The electrolytic paste contained about 2 parts by weight of an electrolyte and about 5 parts by weight of a depolarizer mix. The battery electrolyte employed was an aqueous solution containing 150 grams per liter of ammonium chloride, 90 grams per liter of zinc chloride and 0.5 gram per liter of mercuric chloride. The depolarizer mix utilized was prepared as an admixture of 900 grams of manganese oxide, 100 grams of carbon black prepared from acetylene and 44 grams of ammonium chloride.

The assembled batteries were tested by discharging them five minutes per day in a circuit having an impedance of 4 ohms. Assuming that the useful life of a dry cell terminates when its effective voltage in an external circuit drops below 0.75 volt, the total lives of the batteries were determined as the total time of discharge above the cut off voltage. The battery containing the diaphragm treated with 1.5 percent by weight of the diepoxide had a useful life of 640 minutes. Another battery containing the diaphragm treated with 4.4 percent by weight of the diepoxide had a useful life of 670 minutes.

In other operations similar to those of the foregoing, additional batteries were prepared wherein the diaphragms were of kraft paper and commercial battery separator paper. The useful lives of the otherwise identical batteries prepared with each of the above diaphragm membranes were ascertained in accordance with the above test procedures. Batteries prepared with the kraft and commercial battery papers had lives of 17 and 195 minutes, respectively.

In a manner similar to that of the foregoing, other water-soluble methyl, hydroxyethyl, hydroxypropyl, carboxymethyl, methyl-hydroxypropyl and methyl-hydroxyethyl cellulose ethers can be employed for the above methyl cellulose ether to achieve comparable results. Likewise, other water-soluble diepoxides such as diglycidyl ether, diglycidyl ethers of polyalkylene glycols having a molecular weight or average molecular weight up to 1200 and diglycidyl ethers of glycerol and 1,4-dihydroxybutane can be substituted for the diglycidyl diethylene glycol ether employed in the above specific embodiment to achieve comparable results in the production of highly bibulous but yet water-insoluble membranes suitable for employment as dry cell separating diaphragms.

What is claimed is:

1. A bibulous membrane, permeable to the passage of ions when wetted with water, which bibulous membrane comprises as the principal and the essential ingredient thereof on a dry basis and in substantially uniform distribution throughout the continuous phase of the membrane, the product resulting from the reaction of a water-soluble cellulose ether with from about 0.1 to about 25 percent by weight of the ether of a water-soluble diepoxide having the general formula:

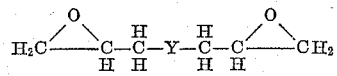

wherein Y is a bivalent member selected from the group consisting of —O— and bivalent residues of water-soluble organic compounds having at least two hydroxyls wherein one labile hydrogen has been removed from each of two hydroxyls.

2. A process for the preparation of a bibulous membrane which comprises the steps of forming a layer of a liquid sol having dissolved therein (A) from about 1 up to about 50 percent by weight of the sol of a water-soluble cellulose ether; (B) from about 0.1 up to about 25 percent by weight based on the weight of the cellulose ether of a water-soluble diepoxide having the general formula:

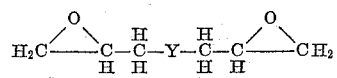

wherein Y is a bivalent member selected from the group consisting of —O— and bivalent residues of water-soluble organic compounds having at least two hydroxyls wherein one labile hydrogen has been removed from each of two hydroxyls; and (C) a small but effective amount of a catalyst for the reaction of epoxide groups with labile hydrogens on the cellulose ether molecules; and thereafter subjecting the layer of the liquid sol to temperatures within the range from about 80° up to 275° C. for a period of time sufficient to provide a dry, water-insolubilized bibulous membrane.

3. A bibulous membrane as in claim 1 wherein the water-soluble cellulose ether is selected from the group consisting of methyl, methyl-hydroxypropyl, hydroxyethyl and carboxymethyl cellulose ethers wherein the number of the respective substituents per glucose residue moiety is sufficient to impart water-solubility to the resulting cellulose ether.

4. A bibulous membrane as in claim 1 wherein the diepoxide is the diglycidyl ether of water-soluble glycols, which glycols have a molecular weight up to 1200.

5. A bibulous membrane as in claim 1 having a thickness from about 1 up to 4 mils.

6. A primary galvanic dry cell comprising a soluble metallic anode, an insoluble cathode, a depolarizer mix admixed with an electrolyte and a diaphragm between said soluble metallic anode and said depolarizer mix, said diaphragm being composed of the water-insoluble, bibulous membrane of claim 5.

References Cited in the file of this patent

UNITED STATES PATENTS

| | | |
|---|---|---|
| 2,455,083 | Musser | Nov. 30, 1948 |
| 2,534,336 | Cahoon | Dec. 19, 1950 |